(«12») United States Patent
Birman et al.

(10) Patent No.: US 6,974,220 B2
(45) Date of Patent: Dec. 13, 2005

(54) BRIGHT POINTER FOR INSTRUMENT CLUSTER

(75) Inventors: Vyacheslav B. Birman, Rochester Hills, MI (US); Werner Eckardt, Rochester, MI (US); Qi Tao, Canton, MI (US); Marcus Moell, Rochester Hills, MI (US)

(73) Assignee: Siemens VDO Automotive Corporation, Auburn Hills ( * ) Notice: Subject to any disclaimer, the term of this patent is extended or adjusted under 35 U.S.C. 154(b) by 35 days.

(21) Appl. No.: 10/725,684

(22) Filed: Dec. 2, 2003

(65) Prior Publication Data

US 2004/0114340 A1   Jun. 17, 2004

Related U.S. Application Data

(60) Provisional application No. 60/433,201, filed on Dec. 12, 2002.

(51) Int. Cl.[7] ............................................. G01D 11/28
(52) U.S. Cl. ............................. 362/26; 362/23; 362/29
(58) Field of Search .............................. 362/26, 23, 29; 336/75, 123, 120; 116/288, 328; 439/11, 439/13

(56) References Cited

U.S. PATENT DOCUMENTS 5,319,527 A * 6/1994 Murphy et al. .............. 362/26
5,839,809 A * 11/1998 Ishimaru et al. ............. 362/23
6,267,072 B1   7/2001 Seto et al.
6,473,554 B1  10/2002 Pelka et al.
6,489,874 B2 * 12/2002 Katsura et al. ............. 336/130
6,854,416 B2 *  2/2005 Breinich et al. ............ 112/202
6,859,126 B2 *  2/2005 Iwao et al. ................... 336/75
2002/0007777 A1 *  1/2002 Oibrich et al. ............. 116/286
2002/0059895 A1 *  5/2002 Adams et al. ............. 116/288
2003/0095398 A1 *  5/2003 Parker et al. ................ 362/29

FOREIGN PATENT DOCUMENTS

| DE | 3703847 | 8/1988 |
| DE | 4122118 | 1/1993 |
| DE | 41 29 057 | 3/1993 |
| FR | 2 668 590 | 4/1992 |
| JP | 95099404 B2 | 10/1995 |
| JP | 2000019994 | 1/2000 |
| WO | WO 94/02777 | 2/1994 |
| WO | WO 94/02778 | 2/1994 |

* cited by examiner

*Primary Examiner*—Sandra O'Shea
*Assistant Examiner*—Anabel Ton

(57) ABSTRACT

An instrument display for a vehicle dash includes a unique light source and light guide assembly. The light source is incorporated directly into the light guide. A non-contact magnetic coupling transfers power from a circuit board to the light source. A textured surface is formed on one portion of the external surface of the light guide to evenly illuminate the light guide. Also, surface roughness on an opposing external surface portion of the light guide is varied depending on the length of the light guide to provide similar luminance for light guides having different lengths.

21 Claims, 2 Drawing Sheets

BRIGHT POINTER FOR INSTRUMENT CLUSTER

CROSS-REFERENCE TO RELATED APPLICATIONS

The application claims priority to U.S. Provisional Application No. 60/433,201, which was filed on Dec. 12, 2002.

BACKGROUND OF THE INVENTION

This invention relates to a method and apparatus that illuminates a light guide with a light source mounted to the light guide where the light source is powered through a non-contact coupling that electrically connects the light source to a circuit board.

Instrument clusters for a vehicle are traditionally located on a vehicle dashboard and include several gauges that indicate various vehicle operating conditions. For example, an instrument cluster may include a speedometer, a tachometer, an engine condition indicator, and other known types of gauges. A panel is mounted to a vehicle structure and typically supports graphical images for the gauges indicating the various vehicle operating conditions. A pointer is mounted for movement relative to each graphical image. The pointer is operably coupled to a motor, which selectively moves the pointer relative to the graphical image. The pointer is illuminated by a light source so that the current vehicle operating conditions can be clearly seen by a vehicle operator.

Traditionally, there are two (2) basic types of pointers, a non-active pointer and an active pointer. In the non-active pointer configuration, the pointer is illuminated by a light source that is mounted to a circuit board. The light source can be positioned behind a light transparent output shaft of the motor, or several light sources can be located on the circuit board around the sides of the output shaft. One disadvantage with this configuration is that only a very small portion of the light flux reaches the pointer. Further, the light intensity is not high enough for special instrument panel applications, such as a black panel cluster, for example. It is also difficult to achieve even luminance along the length of the pointer for this light source configuration.

In the active pointer configuration, the light source is secured to the moving pointer. Flexible wires or mechanical contacts are used to make the electrical connection to the circuit board to power the light source. One disadvantage with this configuration is that the mechanical connections are expensive. Further, this configuration requires an intensive manufacturing process, and assembly is difficult. Also, due to the movement of the mechanical connections in response to movement of the pointer, the active pointer system is not always reliable.

In each pointer configuration discussed above, the pointer includes a body portion that extends from a first end coupled to the motor, to a second end that moves relative to the graphical image. The body portion is typically painted along its length in an attempt to provide even illumination along the pointer body. This painting process increases cost and results in additional operational steps that must be performed during production.

Thus, it is desirable to have a method and system that can provide a bright pointer while eliminating operational process steps such as mechanical connections to the light source and painting, as well as overcoming the other above mentioned deficiencies with the prior art.

SUMMARY OF THE INVENTION

A display cluster for a vehicle instrument panel includes a light guide and a light source that is directly incorporated into the light guide. The light guide moves relative to a graphical image supported by a display surface. The light source illuminates at least a portion of the light guide to indicate a vehicle operating condition displayed by the graphical image. A non-contact coupling transfers power from a circuit board to the light source. This combination provides increased brightness for the light guide while eliminating the need for mechanical connections between a moving light source and the stationary circuit board.

Preferably, the non-contact coupling comprises an electromagnetic coupling. A motor is mounted to the circuit board and includes a motor output shaft that is mounted to the light guide to move the light guide relative to the graphical image. A non-rotating coil assembly includes a housing, defining an interior cavity, with a wire winding wound around an external surface of the housing and connected to the circuit board. A rotating coil assembly is mounted to the light guide. The rotating coil assembly is received within the interior cavity of the housing and is surrounded by the non-rotating coil assembly. The motor output shaft extends through the interior cavity and is coupled to the light guide. The rotating coil assembly is connected to the light source. The light source is powered by the rotating coil assembly, which picks up power from the non-rotating coil assembly through the electromagnetic coupling when current flows through the non-rotating coil assembly.

In one disclosed embodiment, the light guide comprises a pointer having a longitudinally extending body with a first end mounted to the motor output shaft and a second end cooperating with the graphical image. A textured external surface is formed on the body and extends from the first end towards the second end. The textured surface provides even illumination along the length of the pointer.

In one disclosed embodiment, a portion of the external surface of the pointer body is formed with a predetermined roughness. Surface roughness is increased for shorter pointer lengths. Varying the surface roughness ensures that the pointers have similar light intensities regardless of length. The surface roughness feature can be used alone or in addition to the textured surface.

The subject system and method for illuminating a light guide with a light source incorporated directly into the light guide provides increased brightness while eliminating the need for mechanical connections used in prior systems. These and other features of the present invention can be best understood from the following specifications and drawings, the following of which is a brief description.

DETAILED DESCRIPTION OF A PREFERRED EMBODIMENT

Figure 1:
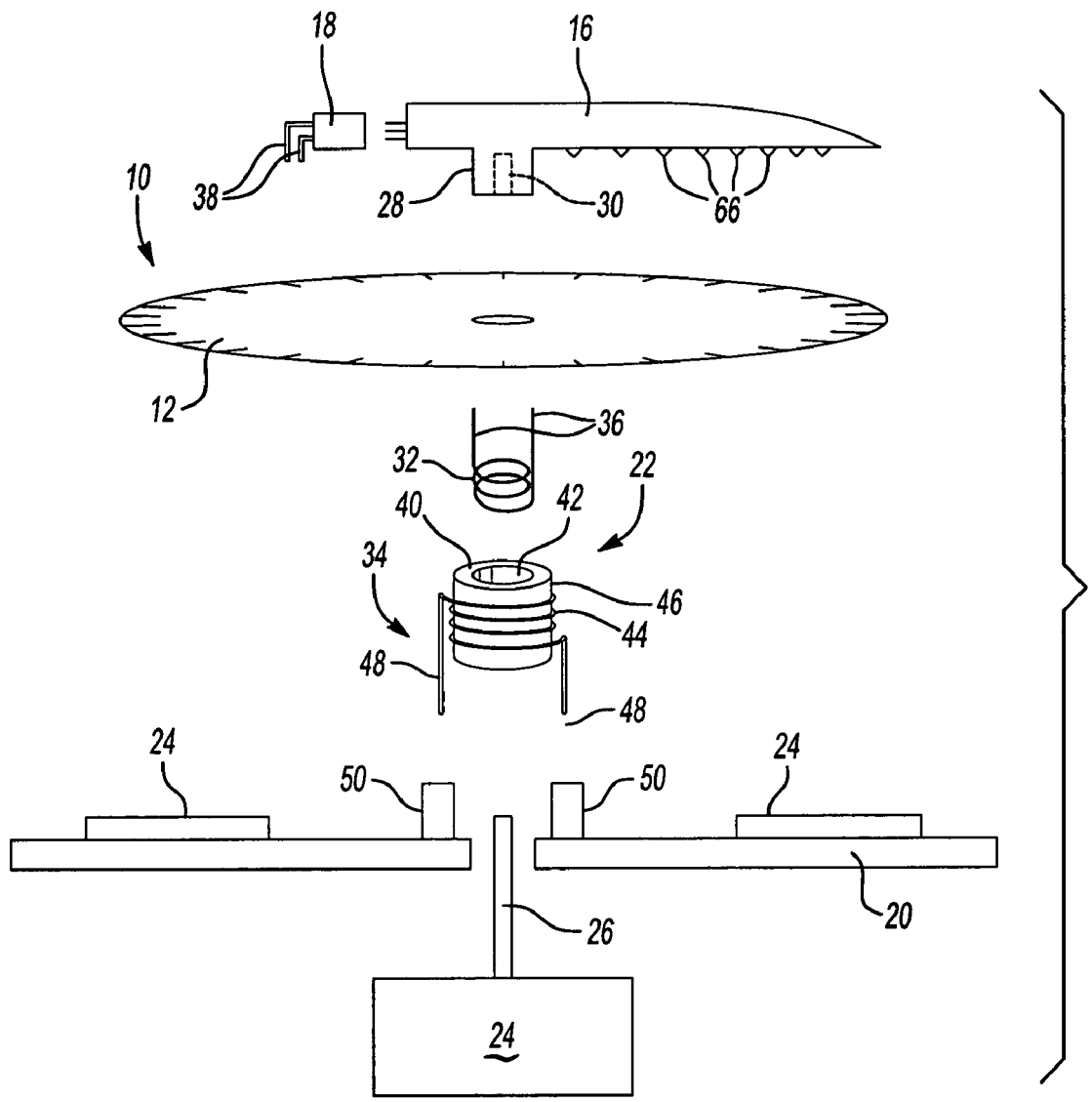
FIG. 1 is an exploded view of an instrument display including a light guide and light source assembly incorporating the subject invention.
Figure 2:
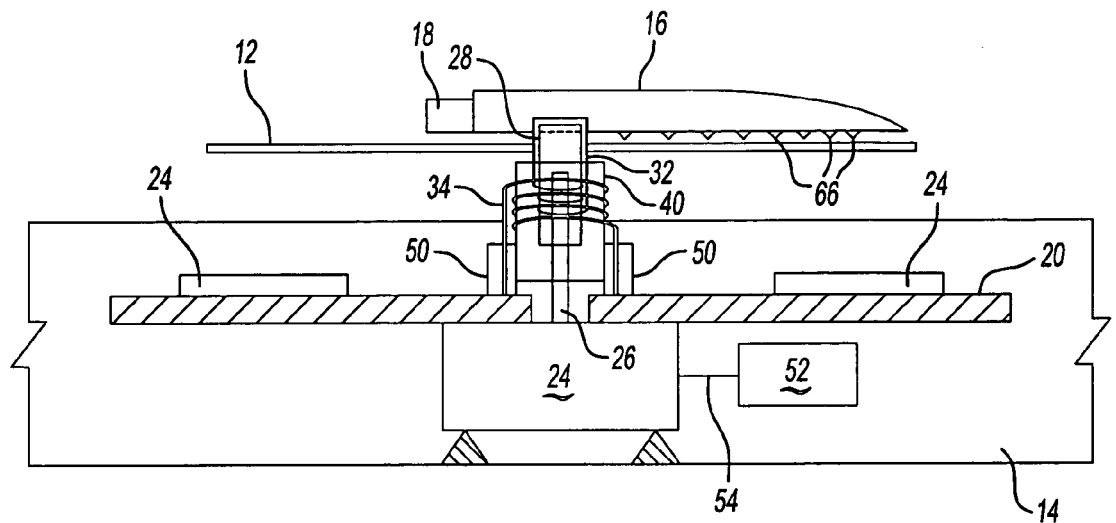
FIG. 2 is an assembled view of the display of FIG. 1.

An instrument cluster including at least one gauge assembly is shown generally at 10 in FIG. 1. The assembly 10 includes a dial 12 that includes a graphical image, such as a scale, for example, which is used to indicate a vehicle operating condition. The dial 12 is mounted to a dash panel or other similar fixed vehicle structure 14 (see FIG. 2). A light guide or pointer 16 is mounted for selective movement relative to the dial 12 and is used to indicate the current status of the vehicle operating condition. A light source 18 is used to illuminate at least a portion of the light guide 16 so that a vehicle operator can clearly see the vehicle operating condition. The light source 18 can illuminate the length of the light guide 16, can illuminate only the tip of the light guide 16, or any other portion thereof. The light source 18 could be an LED or any other light source known in the art.

The light source 18 is mounted directly to the moving light guide 16. This increases the brightness or light intensity available to illuminate the light guide 16. Preferably, the light source 18 is mounted at one end of the light guide 16. The light source 18 receives power from a circuit board 20 through a non-contact coupling, shown generally at 22. The circuit board 20 includes electronics 25 that are used to control various operating conditions of the light guide 16 and the light source 18. The circuit board 20 is mounted to a stationary or fixed vehicle structure 14.

Preferably, the non-contact coupling 22 is an electromagnetic coupling. A motor 24 is mounted to the fixed vehicle structure 14 and includes a motor output shaft 26 that is mounted to the light guide 16. Preferably, the light guide 16 includes a mounting portion 28 with an opening 30 that receives an end of the motor output shaft 26 in an interference fit, however, other attachment methods could also be used.

The electromagnetic coupling 22 further includes a rotating coil 32 and a non-rotating coil 34. The rotating coil 32 includes a wire winding that is wound around the mounting portion 28 of the light guide 16. The rotating coil 32 includes a pair of wire ends 36 that are connected to wire ends 38 on the light source 18. The non-rotating coil 34 includes a housing 40 defining an internal cavity 42, and a magnetic wire winding 44 that is wound around an external surface 46 of the housing 40. The magnetic wire winding 44 includes wire ends 48 that are mounted to electrical posts 50 supported by the circuit board 20.

The assembly 10 is preferably assembled utilizing the following steps. The motor 24 is mechanically mounted to the circuit board 20 by snap-fit or other similar attachment methods known in the art. The motor 24 is electrically connected to the circuit board 20 by soldering, by press-fit spring loaded contacts (not shown), or by other similar methods known in the art. The non-rotating coil 34 with the wire winding 44 is mounted to the circuit board 20 as a subassembly with the motor output shaft 26 extending through the internal cavity 42 of the housing 40. The non-rotating coil 34 should be small enough to fit on a typical instrument cluster circuit board 20 underneath a light guide 16 and can be either a SMD or leaded component.

The rotating coil 32 is then wound around the mounting portion 28 of the light guide 16. The mounting portion 28 and rotating coil 32 are sized to be fit within the internal cavity 42 of the housing 40 to provide clearance between cavity walls and the rotating coil 32. This allows the light guide 16 and rotating coil 32 to rotate freely within the non-rotating coil 34. The wire ends 48 are connected to the posts 50, which are relatively strong in comparison to the small and light weight non-rotating coil 34. The posts 50 are then soldered to the circuit board 20. The dial 12 is inserted over the motor output shaft 26, and the light guide 16 and rotating coil 32 are both then snapped onto the motor output shaft 26, see FIG. 2.

The light guide 16 is driven by the motor 24 and is free to rotate within the cavity 42 formed within the housing 40. A system controller 52 generates a control signal 54, which is communicated to the motor 24. The motor 24 is preferably a stepper motor where an electrical signal is sent to the electrical contacts of the motor 24, which causes the output shaft 26 to rotate. The control signal 54 controls movement of the output shaft 26 so that the light guide 16 is rotated to the desired position relative to the graphical image.

As discussed above, the light guide 16 illumination comes directly from the light source 18 that is incorporated into the light guide 16. The rotating coil 32 powers the light source 18, which is part of the light guide 16 assembly. The rotating coil 32 picks up power from the non-rotating coil 34 mounted on the circuit board 20 through the electromagnetic coupling 22 when alternating current goes through the non-rotating coil 34. The alternating current is delivered to the non-rotating coil 34 by the electronics 25 mounted on the circuit board 20.

It should be understood that any known electronics and associated controls can be used to control movement of the motor 24 and light guide 16. The controls and electronics should be capable of providing sufficient current to realize the full potential of the light source 18. Preferably, the electronics utilize a lower frequency pulse width modulation signal (PWM) carried by a higher frequency carrier wave V1. V2 comprises a logical PWM wave form that has sufficiently high frequency so that an observer will not detect flicker at the light source 18. The frequency for V2 should be significantly lower than the carrier wave V1, which is a logical waveform having a fixed frequency and pulse width. Various factors, known in the art, should be considered when selecting frequencies. The frequencies selected will vary depending upon the type of application, motor size, and size of the rotating and non-rotating coils, for example.

A signal mixer and amplifier are used to generate an output voltage Vout that is comprised of V1 modulated by V2. Vout is used to control motor and coil operation. Vout is varied by signal schronization of the various input signals to control light intensity for dimming and brightening purposes.

Figure 3:
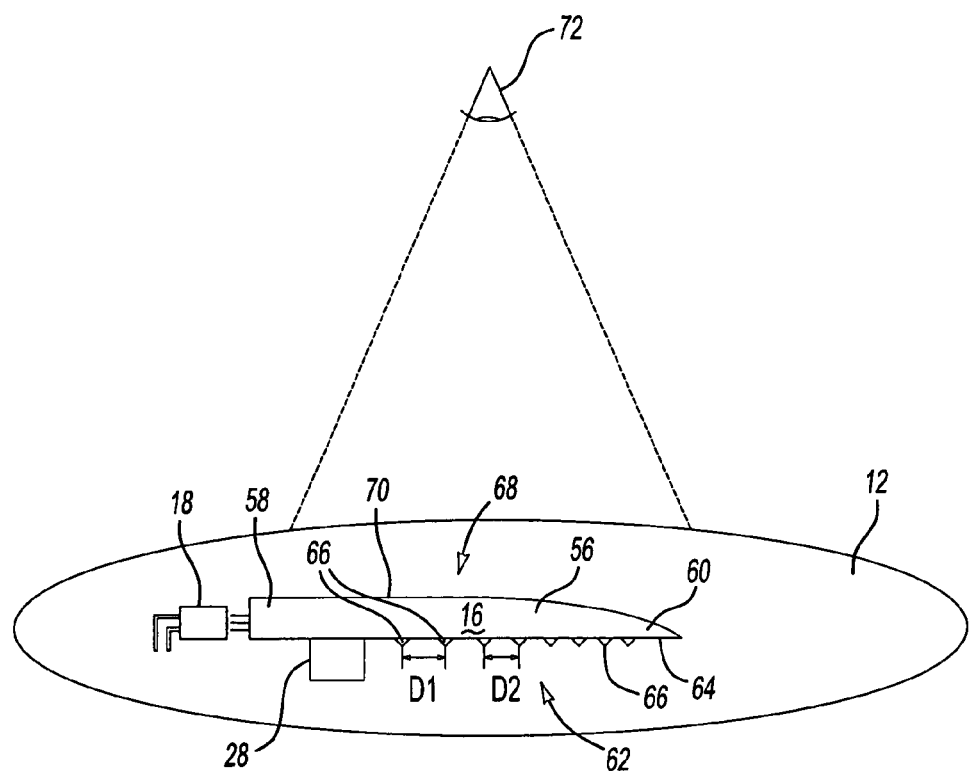
FIG. 3 is side view of the light guide and light source assembly of FIG. 1.

In one disclosed embodiment, shown in FIG. 3, the light guide 16 comprises a pointer having a longitudinally extending body 56 having a first end 58 at which the mounting portion 28 is formed and a second end 60 that moves relative to the graphical image. On one of the external surfaces of the body 56, a textured surface, shown generally at 62, is formed. The textured surface 62 provides even illumination along the length of the body 56 and eliminates the need for a painting operation during production.

Preferably, the textured surface 62 is formed on a lower external surface 64 of the body 56, facing the dial 12. The textured surface 62 is preferably comprised of a plurality of prisms 66. The distance between immediately adjacent prisms 66 decreases from the first end 58 to the second end 60 of the body 56. In other words, the distance between adjacent prisms 66 near the first end 58, see D1, is greater than the distance between adjacent prisms 66 near the second end 60, see D2. This provides even illumination along the body at the second end 60, which is further away from the light source 18. It should be understood that while the use of the textured surface 62 eliminates the need for painting, the subject invention could still use the painting process instead of using the textured surface 62.

In addition to the textured surface 62, a roughened surface, shown generally at 68 can be formed on another external surface of the body 56. Preferably, the roughened surface 68 is formed on an upper external surface 70 of the body 56 facing away from the dial 12, and positioned opposite from the textured surface 62. The degree of roughness varies depending upon the length of the light guide 16. Shorter light guides 16 have rougher upper surfaces 70. This compensates for luminance difference that would be viewed by an observer 72 for guides of different lengths. If the same surface roughness was used regardless of length, shorter light guides 16 would appear to be brighter than longer light guides 16.

The subject provides an active light guide system by utilizing an electromagnetic coupling 22 between the light source 18 and the circuit board 20. One of the benefits with the subject invention is that mechanical connections between the light source 18 and the circuit board 20 are eliminated while still providing a sufficiently bright light at the light guide 16. Further, even illumination is provided by using a textured lower surface 64; and similar illumination, regardless of light guide 16 length, is achieved by varying roughness of the upper external surface 70. This eliminates the need for a painting process. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument display comprising:
   a panel mountable to a vehicle structure and including at least one graphical image indicating a vehicle operating condition;
   a light guide mounted for movement relative to said graphical image;
   a light source mounted to said light guide to illuminate at least a portion of said light guide;
   a circuit board for controlling operational characteristics of said light guide and said light source;
   a non-contact coupling electrically connecting said light source to said circuit board; and
   a power source coupled to said light guide to move said light guide relative to said graphical image wherein said power source is positioned on an opposite side of said circuit board from said non-contact coupling.

2. The display of claim 1 wherein said light guide comprises a pointer having a longitudinally extending body with a first end having a mounting portion and a second end cooperating with said graphical image to indicate the vehicle operating condition and wherein a portion of an external surface of said body is formed with a predetermined roughness to control luminance.

3. The display of claim 1 wherein said light guide comprises a pointer having a longitudinally extending body with a first end having a mounting portion and a second end cooperating with said graphical image to indicate the vehicle operating condition and wherein a portion of an external surface of said body is formed with a textured surface extending from said first end toward said second end to evenly illuminate said pointer.

4. The display of claim 1 wherein said power source comprises a motor having a motor output shaft extending through said circuit board, said motor output shaft being attached to a mounting portion of said light guide.

5. An instrument display comprising:
   a panel mountable to a vehicle structure and including at least one graphical image indicating a vehicle operating condition;
   a light guide mounted for movement relative to said graphical image;
   a light source mounted to said light guide to illuminate at least a portion of said light guide;
   a circuit board for controlling operational characteristics of said light guide and said light source;
   a non-contact coupling electrically connecting said light source to said circuit board; and
   a power source electrically connected to said circuit board and operably coupled to said light guide to move said light guide relative to said graphical image wherein said power source comprises a motor including a motor output shaft coupled to a mounting portion formed on said light guide and wherein said non-contact coupling comprises an electromagnetic coupling having a non-rotating coil assembly mounted to said circuit board and surrounding a portion of said motor output shaft.

6. The display of claim 5 including a rotating coil assembly mounted to and surrounding said mounting portion of said light guide wherein said rotating coil assembly is received within said non-rotating coil assembly with a clearance established between said rotating and non-rotating coil assemblies to allow said light guide to freely rotate.

7. The display of claim 6 wherein said non-rotating coil assembly includes a housing defining an interior cavity and a magnet wire winding wound around an exterior surface of said housing, said magnet wire winding having first and second wire ends that are fixed to electrical posts supported by said circuit board.

8. The display of claim 7 wherein said rotating coil assembly includes a wire winding wound around said mounting portion of said light guide, said wire winding including a pair of wire ends that are connected to said light source.

9. The display of claim 2 wherein said predetermined roughness varies for pointers having different lengths.

10. An instrument display comprising:
    a panel mountable to a vehicle structure and including at least one graphical image indicating a vehicle operating condition;
    a light guide mounted for movement relative to said graphical image wherein said light guide comprises a pointer having a longitudinally extending body with a first end having a mounting portion and a second end cooperating with said graphical image to indicate the vehicle operating condition and wherein a portion of an external surface of said body is formed with a textured surface extending from said first end toward said second end to evenly illuminate said pointer and wherein said textured surface comprises a plurality of prisms spaced apart from each other and extending from said first end to said second end;
    a light source mounted to said light guide to illuminate at least a portion of said light guide;
    a circuit hoard for controlling operational characteristics of said light guide and said light source; and
    a non-contact coupling electrically connecting said light source to said circuit board.

11. A method for illuminating a light guide on an instrument display comprising the steps of:
    (a) mounting a light guide for movement relative to a graphical image;

(b) mounting a light source directly to the light guide;
(c) coupling the light source to a circuit board with a non-contact electromagnetic coupling.

12. The method of claim 11 including the step of forming a portion of an external surface of the light guide with a predetermined roughness to control luminance.

13. The method of claim 12 including the step of varying roughness in response to a change in length of the light guide.

14. The method of claim 11 including the step of forming a portion of an external surface of the light guide with a textured surface extending from a first light guide end toward a second light guide end to evenly illuminate the light guide.

15. The method of claim 14 including the step of forming the textured surface as a plurality of prisms spaced apart from each other along the length of the light guide.

16. The method of claim 11 including the steps of electrically connecting a motor having a motor output shaft to the circuit board, operably coupling the motor output shaft to the light guide to move the light guide relative to the graphical image, mounting a non-rotating coil assembly to the circuit board such that the non-rotating coil surrounds a portion of the motor output shaft, mounting a rotating coil assembly to the light guide, inserting the rotating coil assembly within the non-rotating coil assembly with a clearance established between the rotating and non-rotating coil assemblies to allow the light guide to rotate freely, and powering the light source by transferring power from the non-rotating coil assembly to the rotating coil assembly.

17. An instrument display comprising:
a panel mountable to a vehicle structure and including at least one graphical image indicating a vehicle operating condition;
a light guide mounted for movement relative to said graphical image, said light guide including a body portion with a textured external surface extending along the length of the body portion;
a light source cooperating with said textured external surface to provide even illumination of said light guide wherein said light source is mounted to said light guide;
a circuit board for controlling operational characteristics of said light guide and said light source; and
a coupling electrically connecting said light source to said circuit board wherein said coupling comprises a non-contact electromagnetic coupling.

18. An instrument display comprising:
a panel mounted to a vehicle structure and including at least one graphical image indicating a vehicle operating condition;
a light guide mounted for movement relative to said graphical image wherein said light guide comprises a pointer having a longitudinally extending body with a transversely extending mounting portion at one end;
a light source mounted to said light guide to illuminate at least a portion of said light guide;
a circuit board for controlling operational characteristics of said light guide and said light source; and
a non-contact coupling electrically connecting said light source to said circuit board wherein said non-contact coupling includes a rotating coil mounted to an external surface of said mounting portion and a non-rotating coil mounted to said circuit board.

19. The display of claim 18 wherein said non-rotating coil has a housing defining an internal cavity with a wire winding wound around an external surface of said housing and wherein said rotating coil is mounted within said internal cavity.

20. The method of claim 11 wherein step (c) includes winding a first wire around an external surface of a mounting portion of the light guide to form a rotating coil, forming a non-rotating coil by rotating a second wire around an external surface of a housing mounted to the circuit board, and inserting the rotating coil within an internal cavity formed within the housing such that the rotating coil is circumferentially spaced apart from the non-rotating coil.

21. The method of claim 11 including positioning a power source on an opposite side of the circuit board from the non-contact electromagnetic coupling and driving the light guide with the power source.

* * * * *